(12) United States Patent
Nishio et al.

(10) Patent No.: US 6,335,763 B1
(45) Date of Patent: Jan. 1, 2002

(54) TELEVISION RECEIVER AND ADDITIONAL INFORMATION TRANSMITTING METHOD

(75) Inventors: Toshiro Nishio, Hirakata; Kiyoshi Imai, Kyoto; Akira Usui, Takatsuki; Kiyokazu Hagiwara, Nabari, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 08/791,295

(22) Filed: Jan. 30, 1997

(30) Foreign Application Priority Data

Feb. 5, 1996 (JP) .................................... 8-019175

(51) Int. Cl.$^7$ .................................... H04N 5/445
(52) U.S. Cl. ........................................ 348/564; 348/468
(58) Field of Search ............................ 348/13, 461, 468, 348/563, 564, 553; 340/825.26, 825.27; H04N 7/08, 7/087, 5/44, 5/445

(56) References Cited

U.S. PATENT DOCUMENTS

| 4,894,789 A | 1/1990 | Yee ................................ 364/521 |
| 5,590,195 A | * 12/1996 | Ryan ........................ 340/825.27 |
| 5,818,441 A | * 10/1998 | Throckmorton et al. ...... 348/13 |

FOREIGN PATENT DOCUMENTS

| EP | 0 477 786 A2 | 4/1992 |
| JP | 6-303543 | 10/1994 |
| JP | 7-123375 | 5/1995 |
| WO | WO 95/15660 | 6/1995 |
| WO | WO 96/10888 | 4/1996 |

OTHER PUBLICATIONS

Dufresne, Michel, "New Services: An Integrated Cable Network's Approach", NCTA 31st Annual Convention & Exposition, May 3–5, 1982, Las Vegas, Technical Papers, pp. 156–160, May 1982.*

Ciciora, Walter, "Teletext Systems: Considering the Prospective User", SMPTE Journal, vol. 89, pp. 846–849, Nov. 1980.*

"Multimedia Hypervideo Links for Full Motion Videos" IBM Technical Disclosure Bulletin; vol. 37, No. 4A; Apr. 1, 1994; p. 95; XP000446196 *the whole document*.

* cited by examiner

Primary Examiner—David E. Harvey
(74) Attorney, Agent, or Firm—Parkhurst & Wendel, L.L.P.

(57) ABSTRACT

A television receiver receiving an analog video signal, comprises additional information detecting means for separating and extracting an additional information code from the analog video signal, and outputting the additional information code; additional information recording means for recording the additional information code output from the additional information detecting means; additional information writing switch means for passing or blocking the additional information code that is output from the additional information detecting means toward the additional information recording means, in response to a control signal; conversion means for converting the additional information code output from the additional information detecting means or the additional information code reproduced from the additional information recording means into a character or an image; and signal synthesizing means for synthesizing the analog video signal and the additional information that has been converted into a character or an image by the conversion means, and outputting the synthesized signal as a monitor output signal.

4 Claims, 8 Drawing Sheets

One Chinese character is represented by 16 bits.

TELEVISION RECEIVER AND ADDITIONAL INFORMATION TRANSMITTING METHOD

FIELD OF THE INVENTION

The present invention relates to a television receiver, and an additional information transmitting method for transmitting a television signal in which a program or commercial and additional information relating to, or more specific than, the program or commercial are multiplexed. More specifically, the invention relates to a television receiver that can collect and record the additional information as desired, and a method for multiplexing the additional information with an MPEG2-Video stream.

BACKGROUND OF THE INVENTION

In recent television broadcasting, "multiple broadcasting" for transmitting a television signal in which an ordinary program or commercial and information relating to, or more specific than, the program or commercial are multiplexed by VBI multiplexing or FM multiplexing, has been put to practical use. This broadcasting system has an advantage over conventional systems in that it can transmit more information within a given broadcasting time. However, for the user who receives the information, it is necessary to set the receiver in the multiple broadcast receiving mode and refer to the additional information all the time. This sometimes results in oversupply of information, and means for arranging a flood of information is needed.

However, there has conventionally been no television receiver capable of arranging such additional information with high efficiency. Hence, under the existing circumstances, the user sets the receiver in the multiple broadcast receiving mode to receive the additional information and displays the information on the screen to see the information. As a method for recording the received additional information, it is thinkable to record the information received in the multiple broadcast receiving mode as it is in a video recorder or the like. In this case, however, to record only required information, the recording operation of the video recorder must be performed only when the required information appears, while referring to the additional information displayed on the screen, and this process is very complicated.

SUMMARY OF THE INVENTION

It is an object of the present invention to provide a television receiver that can select, at user's request, additional information being broadcasted simultaneously with a broadcasted program and that can rearrange the additional information to make a data base.

It is another object of the present invention to provide a television receiver that can be applicable to digital broadcasting and that can take only desired additional information by selecting, at user's request, an icon displayed in a prescribed position on a picture.

It is still another object of the present invention to provide an additional information transmitting method wherein a digitally coded television signal and additional information are efficiently multiplexed and transmitted.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a first aspect of the present invention, a television receiver receiving an analog video signal, comprises additional information detecting means for separating and extracting an additional information code from the analog video signal, and outputting the additional information code; additional information recording means for recording the additional information code output from the additional information detecting means; additional information writing switch means for passing or blocking the additional information code that is output from the additional information detecting means toward the additional information recording means, in response to a control signal; conversion means for converting the additional information code output from the additional information detecting means or the additional information code reproduced from the additional information recording means into a character or an image; and signal synthesizing means for synthesizing the analog video signal and the additional information that has been converted into a character or an image by the conversion means, and outputting the synthesized signal as a monitor output signal.

According to a second aspect of the present invention, a television receiver receiving a digitally coded television signal, comprises digital television signal analyzing means for analyzing the digitally coded television signal, separating and extracting additional information included in the television signal from the television signal, and outputting the additional information as an additional information code; additional information recording means for recording the additional information code output from the digital television signal analyzing means; additional information writing switch means for passing or blocking the additional information code that is output from the digital television signal analyzing means toward the additional information recording means, in response to a control signal; conversion means for converting the additional information code output from the digital television signal analyzing means or the additional information code. reproduced from the additional information recording means into a character or an image; digital television signal decoding means for decoding the digitally coded television signal and outputting a video signal; and signal synthesizing means for synthesizing the video signal output from the decoding means and the additional information that has been converted into a character or an image by the conversion means, and outputting the synthesized signal as a monitor output signal.

According to a third aspect of the present invention, in the above-mentioned television receiver, the control signal controls the additional information writing switch means so that it passes the additional information code only when additional information designated by the user is detected.

According to a fourth aspect of the present invention, a television receiver receiving a digitally coded television signal, comprises digital television signal analyzing means for analyzing the digitally coded television signal, separating and extracting additional information included in the television signal from the television signal, and outputting the additional information; image signal outputting means for decoding the digitally coded television signal with reference to the additional information output from the analyzing means, and outputting detailed information relating to the additional information as an image signal; image signal recording means for recording the image signal output from the image signal outputting means; image signal writing switch means for passing or blocking the image signal that is output from the image signal outputting means toward the image signal recording means, in response to a control signal; digital television signal decoding means for decoding the digitally coded television signal and outputting a video signal; and signal synthesizing means for synthesizing the video signal output from the decoding means and the image signal output from the image signal outputting means or the image signal read from the image signal recording means, and outputting the synthesized signal as a monitor output signal.

According to a fifth aspect of the present invention, in the above-mentioned television receiver, the digital television signal analyzing means separates and extracts a channel number or a still picture number including detailed information, as additional information, from the digitally coded television signal.

According to a sixth aspect of the present invention, in the above-mentioned television receiver, the control signal controls the image signal writing switch means so that it passes the image signal only when additional information designated by the user is detected.

According to a seventh aspect of the present invention, a television receiver receiving a digitally coded television signal, comprises digital television signal analyzing means for analyzing the digitally coded television signal, separating and extracting additional information that shows the position of an image on a picture, which image is obtained by decoding the digitally coded television signal, from the television signal, and outputting the additional information; means for displaying an icon in a position on a monitor screen, which position is specified by the additional information output from the digital television signal analyzing means; means for selecting the icon; and image signal outputting means for decoding the digitally coded television signal when the icon is selected, and outputting, as an image signal, detailed information that is transmitted corresponding to the position of the icon.

According to an eighth aspect of the present invention, the above-mentioned television receiver further comprises detailed information recording means for recording the detailed information.

According to a ninth aspect of the present invention, in an additional information transmitting method for transmitting a digitally coded television signal in which a program or a commercial and additional information relating to, or more specific than, the program or commercial are multiplexed, additional information to be transmitted is written in a user data region of the digitally coded television signal when the additional information is transmitted.

According to a tenth aspect of the present invention, in the above-mentioned additional information transmitting method, transmitted as the additional information are a code showing an object that provides information, and one of a character information code and an image information code, which shows information of the object.

According to an eleventh aspect of the present invention, in the above-mentioned additional information transmitting method, transmitted as the additional information are a code showing an object that provides information, and one of the number of a channel transmitting detailed information of the object and the number of a still picture displaying the detailed information of the object.

According to a twelfth aspect of the present invention, in the above-mentioned additional information transmitting method, transmitted as the additional information are a code showing the position of an image on a screen, which image is obtained by decoding the digitally coded television signal, and one of the number of a channel transmitting detailed information corresponding to the position and the number of a still picture displaying detailed information corresponding to the position.

According to a thirteenth aspect of the present invention, in the above-mentioned additional information transmitting method, an MPEG2-Video stream is employed as the digitally coded television signal.

DETAILED DESCRIPTION OF THE PREFERRED EMBODIMENTS

Embodiment 1

Figure 1:
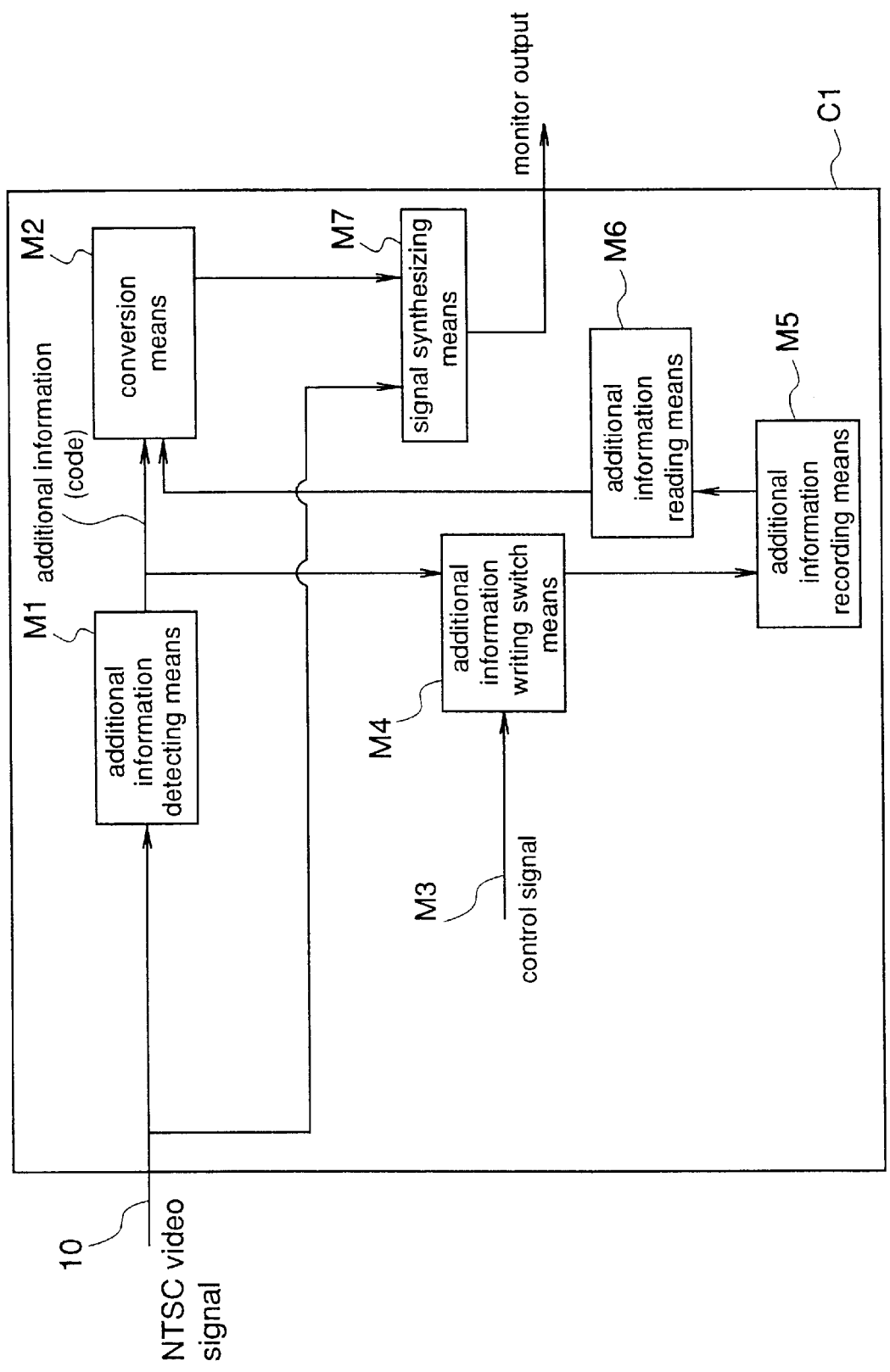
FIG. 1 is a block diagram illustrating a fundamental structure of a television receiver according to the present invention.

FIG. 1 is a block diagram illustrating a fundamental structure of a television receiver receiving an NTSC (National Television System Committee) video signal, according to the present invention. As shown in FIG. 1, the television receiver comprises an additional information detecting means M1 for separating and extracting an additional information code from the NTSC video signal 10 and outputting the additional information code; an additional information recording means M5 for recording the additional information code output from the detecting means M1; an additional information writing switch means M4 for passing or blocking the additional information code that is output from the detecting means M1 toward the recording means M5, in response to a control signal M3; a conversion means M2 for converting the additional information code output from the detecting means M1 or the additional information code read from the recording means M5 into a character or an image; and a signal synthesizing means M7 for synthesizing the NTSC video signal and the additional information that is converted into a character or an image by the conversion means M2, and outputting the synthesized signal as a monitor output signal. The television receiver so constructed can select desired information from television signals in which an ordinary program or commercial and other information (additional information) relating to, or more specific than, the program or commercial are multiplexed, and collect and record the additional information. The collected and recorded additional information can be utilized in many ways as a data base.

As the control signal M3, a recording request signal which is input to the receiver directly by the user who requests recording of the additional information is employed. Further, the receiver may be provided with a code comparing means which retains a code (key word) that shows the additional information for which the user requests recording, and outputs a signal that makes the additional information switch means M4 pass the additional information code output from the additional information detecting means M1 when the additional information code includes the key word. In this case, the output signal from the code comparing means can be used as the control signal M3. When the receiver includes such a code comparing means, only desired additional information is automatically stored in the additional information recording means M5 after a given period of time, by setting the key word in advance, with no necessity of user's requesting recording of the additional information from the outside.

Figure 3:
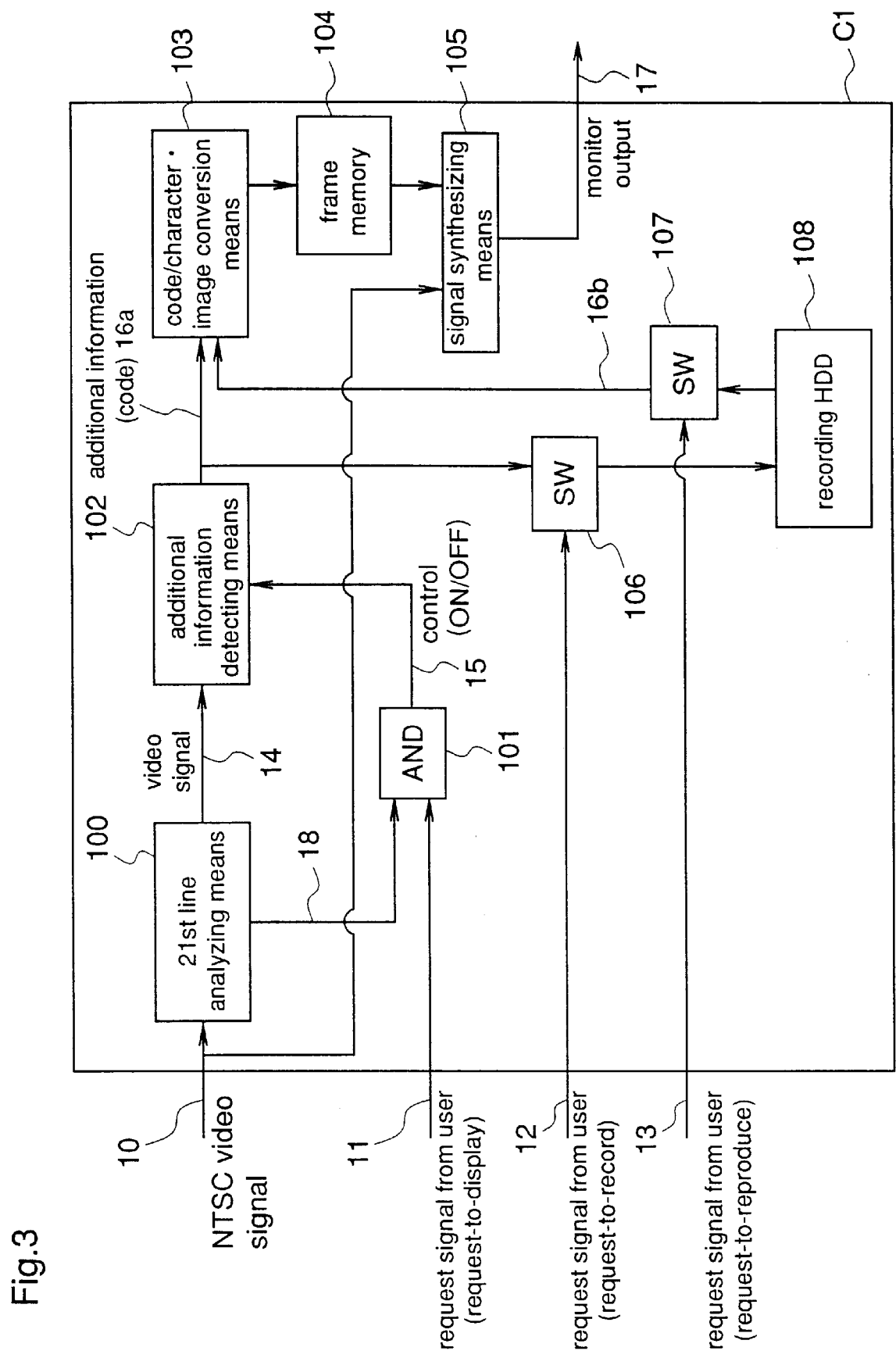
FIG. 3 is a block diagram illustrating a television receiver according to a first embodiment of the invention, on the basis of the structure shown in FIG. 1.

FIG. 3 is a block diagram illustrating a specific structure of a television receiver according to a first embodiment of the invention, on the basis of the fundamental structure shown in FIG. 1. In FIG. 3, reference numeral 11 designates an additional information display request signal input by the user, and reference numeral 12 designates an additional information recording request signal input by the user. The recording request signal 12 corresponds to the control signal M3 shown in FIG. 1. Reference numeral 13 designates an additional information reproduction request signal from the user. Reference numeral 100 designates a 21st line analyzing means for receiving the NTSC signal 10 and detecting the 21st line to decide whether the additional information is transmitted or not. Reference numeral 18 designates a signal indicating that the additional information is transmitted through the 21st line analyzing means 100. Reference numeral 101 designates an AND circuit for receiving the additional information display request signal 11 and the signal 18, and controlling ON/OFF switching of an additional information detecting means 102 on the basis of these signals. The additional information detecting means 102 corresponds to the additional information detecting means M1 shown in FIG. 1. This additional information detecting means 102 receives the video signal 14 transmitted through the analyzing means 100 and, when it is turned on by a control signal 15 from the AND circuit 101, it separates and extracts the additional information from the video signal 14 and outputs the additional information. Reference numeral 103 designates a code/character-image conversion means for converting additional information codes 16a and 16b into characters or images, and this means 103 corresponds to the conversion means M2 shown in FIG. 1. Reference numeral 104 designates a frame memory for temporarily storing the converted additional information. Reference numeral 105 designates a signal synthesizing means for synthesizing the NTSC video signal 10 and the additional information signal stored in the frame memory 104, and outputting the synthesized signal as a monitor output signal 17. The frame memory 104 and the signal synthesizing means 105 correspond to the signal synthesizing means M7 shown in FIG. 1. Reference numeral 108 designates a recording medium, such as an HDD (Hard Disk Drive), for recording and storing the additional information code 16a output from the additional information detecting means 102. The recording HDD 108 corresponds to the additional information recording means M5 shown in FIG. 1. Reference numeral 106 designates a switch for authorizing the recording HDD 108 to record the additional information code 16a output from the detecting means 102 when a recording request signal 12 is input. This switch 106 corresponds to the additional information writing switch means M4 shown in FIG. 1. Reference numeral 107 designates a switch for reading the additional information recorded in the recording HDD 108, and outputting the additional information toward the code/character-image conversion means 103 when a reproduction request signal 13 is input.

Figure 4:
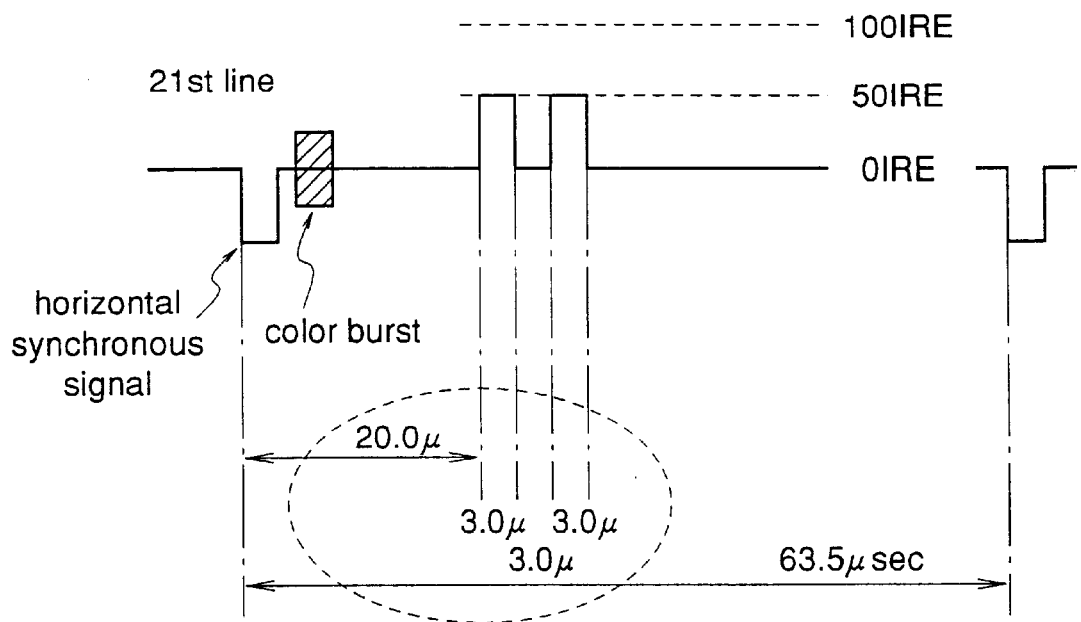
FIG. 4(a) is a diagram illustrating a waveform of a line that shows the start of additional information of an NTSC signal input to the television receiver according to the first embodiment.
FIG. 4(b) is a diagram illustrating a waveform of a line that shows data of the additional information of the NTSC signal.
Figure 4:
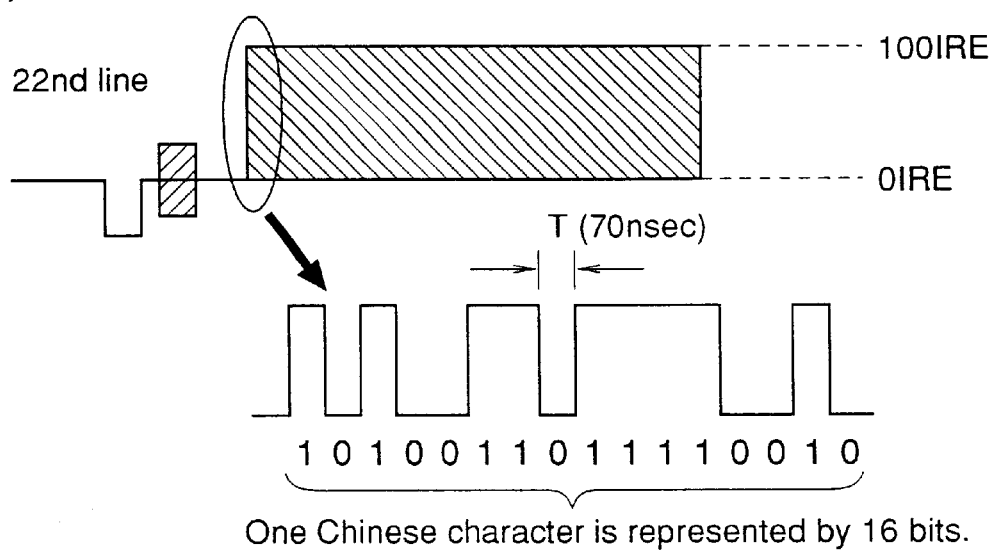

A description is given of the operation of the television receiver according to the first embodiment of the invention. FIG. 4(a) shows a waveform of a line that shows the start of additional information in the NTSC video signal 10, and FIG. 4(b) shows a waveform of a line that shows data of additional information in the NTSC video signal 10. In order to inform that transmission of additional information is performed, as shown in FIG. 4(a), the received NTSC signal 10 is subjected to multiplexing using VBI (Vertical Blanking Interval) to produce a waveform on the 21st line, which waveform informs that a commodity code will be sent next, and as shown in FIG. 4(b), a character code, for example, a JIS code, is sent by another line, for example, the 22nd line. Assuming that the pulse width T is $1/(4 \times f_{sc})$ since the color subcarrier frequency $f_{sc}$ in the NTSC system is 3.58 MHz, the pulse width T is 70 nsec. Although one line consists of 910 dots, since a portion of the line is already used by the horizontal synchronous pulse and the color burst, the effective length of the line for the signal is 768 dots. When Chinese characters are used, since 16 bits (dots) are needed for coding of one Chinese character, 48 (=768/16) characters can be transmitted per one line.

It is possible to transmit graphic information, instead of characters, in the form of a bit map. However, the transmission capacity is limited in the NTSC system. For example, when image data is transmitted by 24 bits, in the order of Red, Blue, Green, at 8-bit resolution, data of 32 dots (=768/24) can be transmitted by one line. So, in order to transmit a 256×256 bit map, 2048 lines (=256×256/32) are needed. Assuming that one line is used in one field, 2048 fields are needed. Since 60 fields are transmitted in one second, it takes 34 seconds (2048/60) to transmit the 256×256 bit map. Consequently, there is a limitation in the size of image data that can be actually transmitted.

When both the additional information display request signal 11 and the signal 18 which shows that the additional information is currently being transmitted are input to the AND circuit 101, the additional information detecting means 102 is turned on, and the detecting means 102 extracts the additional information code 16a of 48 characters per one line from the video signal 14. This additional information code 16a is recorded in the recording HDD 108 when the switch 106 is turned on by the recording request signal 12. Meanwhile, the additional information code 16a is converted into characters by the code/character-image conversion means 103, and character data for one picture is stored in the frame memory 104. The signal synthesizing means 105 synthesizes the NTSC video signal 10 and the character data stored in the frame memory 104, and outputs a monitor output signal 17.

On the other hand, when the reproduction request signal 13 from the user is input to the switch 107, the switch 107 is turned on, and data 16b of the additional information recorded in the HDD 108 is read from the HDD 108. The additional information data 16b is converted into character information by the code/character-image conversion means 103, and character information for one picture is stored in the frame memory 104. Thereafter, the character information is output, through the signal synthesizing means 105, as a monitor output signal 17. When the NTSC video signal 10 is input to the receiver, the character information is synthesized with the video signal that is currently being received, and displayed as character data. When the NTSC video signal 10 is not input to the receiver, only the character information is displayed.

When the video signal and the character data are synthesized by the signal synthesizing means 105, they are processed so that the monitor signal 17 can be displayed by screen splitting into two pictures.

In the foregoing description, the additional information code 16a is recorded when the recording request signal 11 from the user is input. However, when a commercial is broadcasted, a commodity code requested by the user is reserved in advance, and this commodity code is compared with the commodity code transmitted by the 21st line. Only when the requested code matches the transmitted code, the additional information is recorded in the recording HDD 108. In this case, after a given period of time, a data base wherein information desired by the user is stored is automatically created.

As described above, according to the first embodiment of the invention, in the NTSC system television receiver, additional information, which is transmitted with a video signal, is extracted by the additional information detecting means 102, and the extracted additional information is recorded in the recording HDD 108 in response to the recording request signal 12 from the user. On the other hand, the recorded additional information is reproduced from the HDD 108 in response to the reproduction request signal 13 from the user, and displayed. Therefore, the real-time displayed additional information can be cataloged, and the user can see the catalog anytime, resulting in effective use of the additional information. Furthermore, when the kind of additional information desired by the user is reserved in advance, only the desired additional information is selected and automatically cataloged. That is, the user can collect the additional information when a given period of time has passed, resulting in highly efficient information collection.

Embodiment 2

Figure 2:
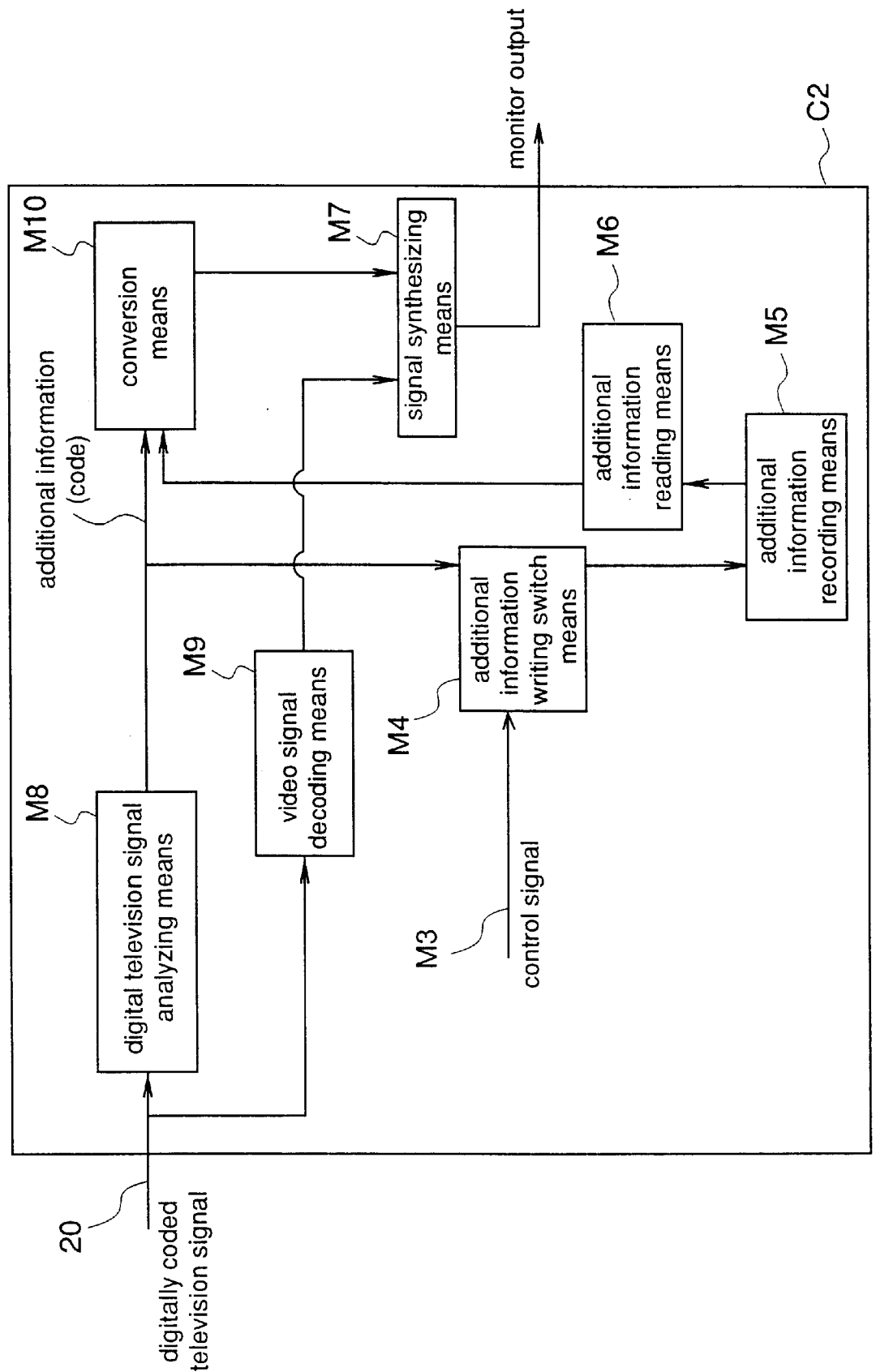
FIG. 2 is a block diagram illustrating another fundamental structure of a television receiver according to the present invention.

FIG. 2 is a block diagram illustrating a fundamental structure of a television receiver receiving a digitally coded video signal, according to the present invention. As shown in FIG. 2, the television receiver comprises a digital television signal analyzing means M8 for analyzing the digitally coded video signal 20, separating and extracting additional information from the video signal 20, and outputting the additional information as an additional information code; an additional information recording means M5 for recording the additional information code output from the analyzing means M8; an additional information writing switch means M4 for passing or blocking the additional information code which is output from the analyzing means M8 toward the recording means M5, in response to a control signal M3; a conversion means M10 for converting the additional information code output from the analyzing means M8 or the additional information code read from the recording means M5 into a character or the like; a digital television signal decoding means M9 for decoding the digital video signal and outputting a video signal; and a signal synthesizing means M7 for synthesizing the video signal output from the decoding means M9 and the additional information that has been converted into a character by the conversion means M10, and outputting the synthesized signal as a monitor output signal. In the television receiver so constructed, desired information can be selected from television signals in which an ordinary program or commercial and other information (additional information) relating to, or more specific than, the program or commercial, are multiplexed, and the selected information can be collected and recorded. The recorded additional information can be used in many ways as a data base.

As the control signal M3, a recording request signal which is input to the receiver directly by the user who requests recording of the additional information is employed. Further, the receiver may be provided with a code comparing means which retains a code (key word) that shows the additional information for which the user requests recording, and outputs a signal that makes the additional information switch means M4 pass the additional information code output from the additional information detecting means M1 when the additional information code includes the key word. In this case, the output signal from the code comparing means can be used as the control signal M3. When the receiver includes such a code comparing means, only desired additional information is automatically stored in the additional information recording means M5 after a given period of time, by setting the key word in advance, with no necessity of user's requesting recording of the additional information from the outside.

Figure 5:
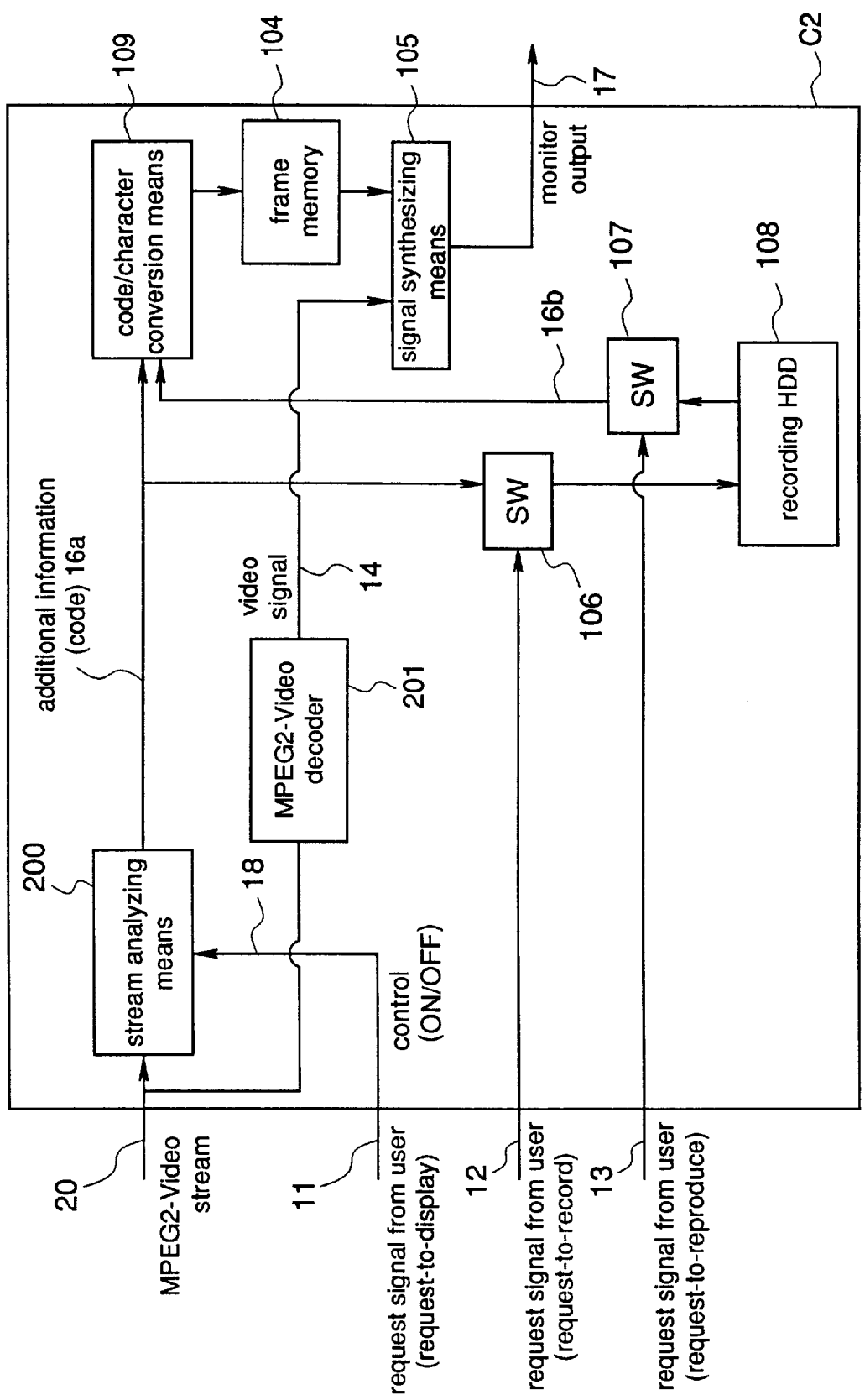
FIG. 5 is a block diagram illustrating a television receiver according to a second embodiment of the invention, on the basis of the structure shown in FIG. 2.

FIG. 5 is a block diagram illustrating a specific structure of a television receiver according to a second embodiment of the invention, on the basis of the fundamental structure shown in FIG. 3. In FIG. 5, the digitally coded television signal 20 is an MPEG2-Video stream. Reference numeral 200 designates a stream analyzing means for receiving the MPEG2-Video stream 20 and separating and extracting an additional information code, such as characters, from the stream 20. This stream analyzing means 200 corresponds to the digital television signal analyzing means M8 shown in FIG. 2. ON/OFF switching of the stream analyzing means 200 is controlled by an additional information display request signal 11 from the user. Reference numeral 201 designates an MPEG2-Video decoder for receiving the MPEG2-Video stream 20 and converting the coded video information into a video signal 14. This decoder 201 corresponds to the digital television signal decoding means M9 shown in FIG. 2. In FIG. 5, the same reference numerals as those shown in FIG. 2 designate the same or corresponding parts.

A description is given of the operation of the television receiver shown in FIG. 5. In the MPEG2-Video stream 20 to be received, video information and character information are stored in a prescribed format. When the display request signal 11 from the user is input, the stream analyzing means 200 is turned on, and the analyzing means 200 extracts additional information, such as characters, from the MPEG2-Video stream 20 and outputs an additional information signal 16a. It is possible to use, for the additional information, a user data region (8 bits) in the MPEG standard that is defined independently. That is, when an identifier of the additional information is '0000 0100' and a commodity code is '0110 0110 1111 1111 0000 0000', the additional information is defined as follows.

0000 0000 0000 0000 0000 1011 0010 . . . User Data Start Code (0xB2)

0000 0100 . . . identifier of the additional information

0110 0110. . . first 8 bits in the commodity code of 24

1111 1111 . . . next 8 bits in the commodity code 0000 0000 . . . last 8 bits in the commodity code 0011 1011 . . . upper 8 bits in 16 bits showing one Chinese character 1100 1101 . . . lower 8 bits in 16 bits showing one Chinese character

. . .

. . .

0000 0000 0000 0000 0001 . . . User Data End Code

Therefore, when the stream analyzing means 200 receives the stream 20 in the format mentioned above, it identifies that the present stream is the additional information '0000 0100' the additional information relates to the commodity code '0100 0110 1111 1111 0000 0000'. The data can be sent unlimited until the User Data End Code is sent.

On the other hand, the MPEG2-Video decoder 201 converts the video information included in the MPEG2-Video stream 20 into a video signal 14 and outputs the video signal 14 signal synthesizing means 105. The additional information code 16a output from the stream analyzing means 200 is subjected to code-to-character conversion by the code/character conversion means 109 and stored in the frame memory 104 as data for one picture. In this stage, when the recording request signal 12 from the user is input, the switch 106 is turned on, and the additional information code 16a output from the stream analyzing means 200 is written in the recording HDD 108. The additional information stored in the frame memory 104 is synthesized with the video signal 14 output from the MPEG2-Video decoder 201, by the signal synthesizing means 105, resulting in a monitor output signal 17.

On the other hand, the additional information recorded in the recording HDD 108 is read from the HDD 108 when the reproduction request signal 13 from the user is input and the switch 107 is turned on. Thereafter, the additional information reproduced from the HDD 108 is processed through the code/character conversion means 109, the frame memory 104, and the signal synthesizer 105 in the same manner as mentioned above, resulting in a monitor output signal 17. This monitor signal 17 is displayed on the monitor screen so that it is split into two pictures on the screen.

Also in this second embodiment of the invention, as in the first embodiment mentioned above, when a commercial is broadcasted, a commodity code requested by the user is reserved in advance, and this commodity code is compared with the commodity code included in the MPEG2-Video stream transmitted by the stream analyzing means 200. Only when the requested code matches the transmitted code, the additional information is recorded in the recording HDD 108. In this case, a data base wherein information desired by the user is stored is automatically created after a given period of time.

As described above, according to the second embodiment of the present invention, in the digital television receiver employing MPEG2-Video system, additional information, which is transmitted with an ordinary video signal, is analyzed by the stream analyzing means 200, and only the additional information is extracted and output as the additional information code 16a. The additional information code 16a is recorded in the recording HDD 108 in response to the user request. On the other hand, the recorded additional information is reproduced from the HDD 108 in response to the reproduction request from the user, and displayed. Therefore, the real-time displayed additional information can be cataloged, and the user can see the catalog anytime, resulting in effective use of the additional information. Furthermore, when the kind of additional information desired by the user is reserved in advance, only the desired additional information is selected and automatically cataloged. That is, the user can collect the additional information when a given period of time has passed, resulting in highly efficient information collection.

Embodiment 3

Figure 6:
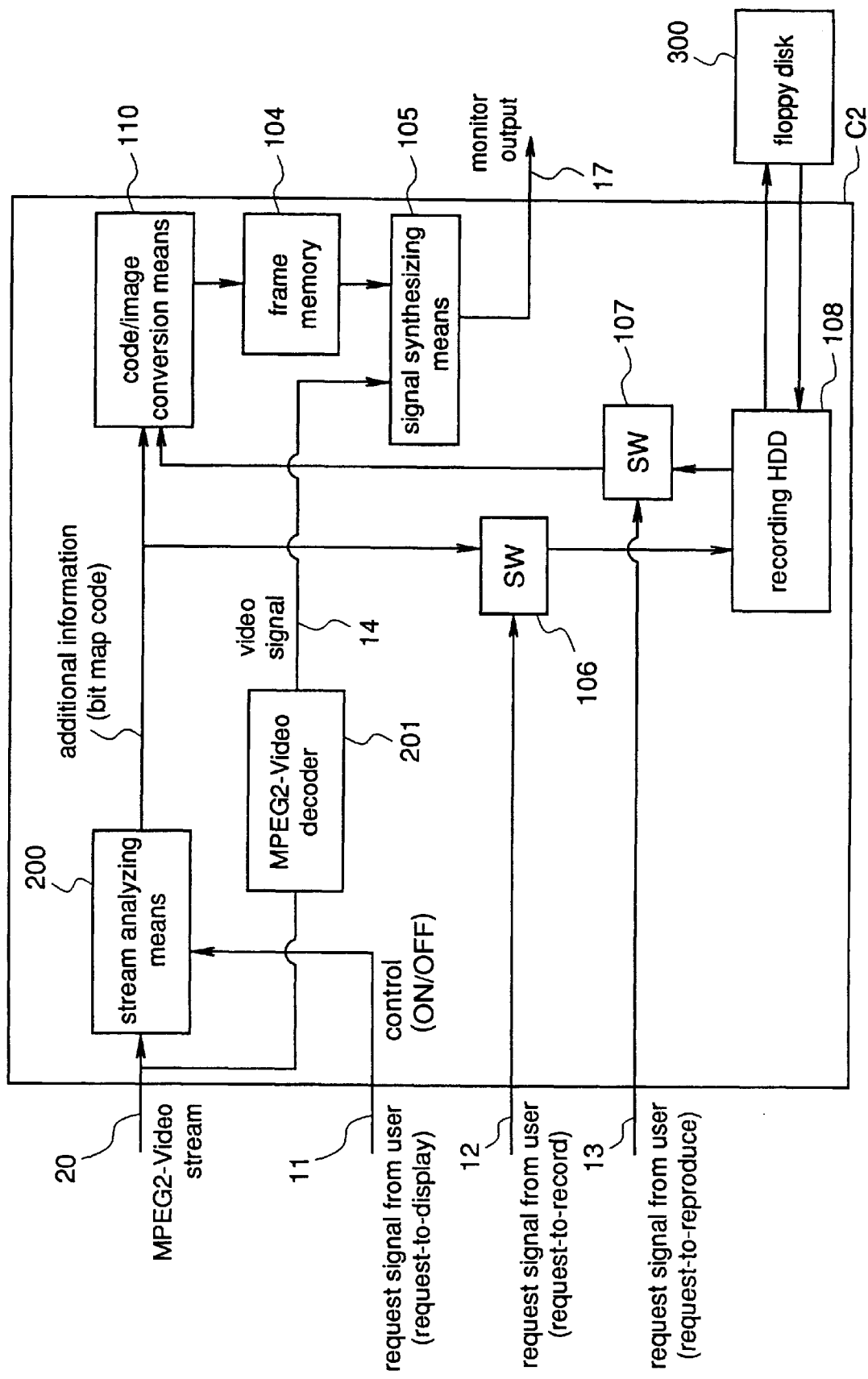
FIG. 6 is a block diagram illustrating a television receiver according to a third embodiment of the present invention, on the basis of the structure shown in FIG. 2.

FIG. 6 is a block diagram illustrating a television receiver according to a third embodiment of the invention, which is based on the fundamental structure shown in FIG. 2. In FIG. 6, the same reference numerals as those shown in FIG. 5 designate the same or corresponding parts. Reference numeral 110 designates a code/image conversion means for converting additional information (image data represented by a bit map code) extracted from the MPEG2-Video stream 20 by the stream analyzing means 200 into an image signal. Reference numeral 300 designates a removable recording medium, such as a floppy disk, that can exchange data with the recording HDD 108.

A description is given of the operation of the television receiver shown in FIG. 6. In the television receiver according to the third embodiment, the fundamental operation of recording and reproducing the additional information is identical to that already described for the television receiver according to the second embodiment. In this third embodiment, however, since image data is processed as additional information whereas character data is processed in the second embodiment, the additional information is in a bit map format, and the data is subjected to code-to-image conversion by the conversion means 110. Since the MPEG2-Video format is employed in this third embodiment, information of a relatively large amount, such as graphic information, can be processed as additional information, whereby the range of multiplication of broadcasting is increased.

Further, the removable recording medium 300, for example, a floppy disk, is useful for information exchange. Usually, the additional information recorded in the recording HDD 108 is read from the HDD 108 and displayed on the monitor when the user needs to see it. When the user needs to exchange the additional information with another person, the user selects necessary information from the HDD 108 and writes the information on the floppy disk 300. The person who receives the floppy disk 300 writes the information recorded in the floppy disk 300 onto his/her HDD 108, whereby the person can capture the additional information created by another person into his/her data base. Such a removable recording medium 300 can be applied to the television receivers according to the first and second embodiments of the invention with the same effect as mentioned above.

Embodiment 4

Figure 7:
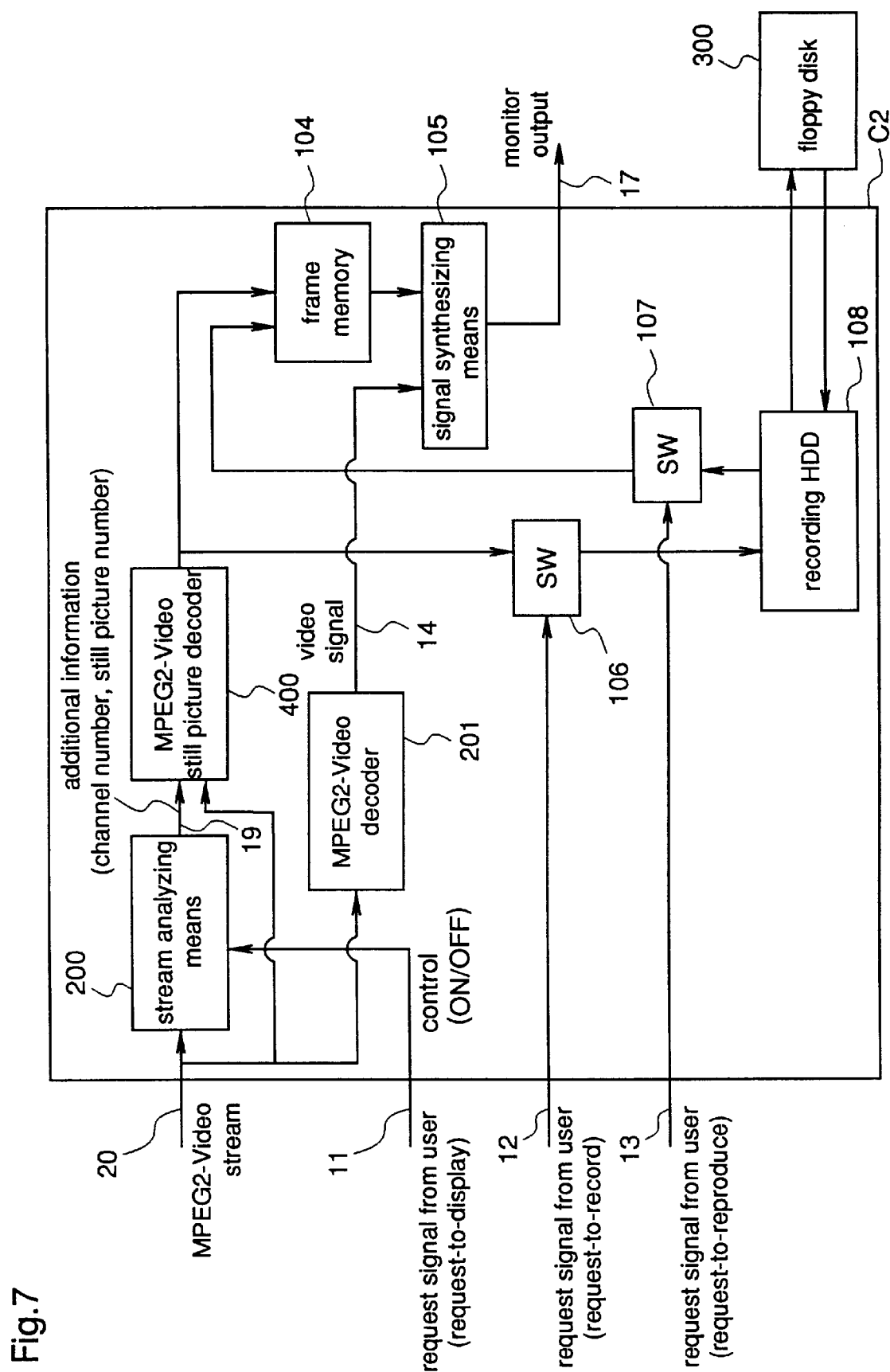
FIG. 7 is a block diagram illustrating a television receiver according to a fourth embodiment of the invention.

FIG. 7 is a block diagram illustrating a television receiver according to a fourth embodiment of the present invention. While in the second and third embodiments the entire additional information is written in the user data region of the MPEG2-Video stream 20 within the MPEG standard, in this fourth embodiment only a channel number or a still picture number having detailed information is written in the user data region as additional information. In FIG. 7, reference numeral 400 designates an MPEG2-Video still picture decoder for receiving an additional information (channel number or still picture number) signal 19 extracted from the MPEG2-Video stream 20 by the stream analyzing means 200, and decoding a channel of the MPEG2-Video stream 20 specified by the additional information or a still picture specified by the additional information. In this fourth embodiment, according to the additional information, the MPEG2-Video still picture decoder 400 decodes the MPEG2-Video stream 20 and outputs an image signal, and the image signal is recorded in the recording HDD 108.

A description is given of the operation of the television receiver according to the fourth embodiment. The stream analyzing means 200 detects an identification code of additional information, a commodity code, and a channel number (or a still picture number) having detailed information, which are included in the MPEG2-Video stream after, the MPEG2-Video still picture decoder 400 decodes detected channel (image) according to the channel number (still picture number) that follows the detected channel. It is possible to use, for the additional information ,an independently defined user data region (8 bits) in the MPEG standard. That is, when an identifier of additional information is '0000 0100' and a commodity code is '110 1111 1111 0000 0000', the additional information is defined as follows.

0000 0000 0000 0000 0000 1011 0010 . . . User Data Start Code (0×B2)
    0000 0100 . . . identifier of additional information
    0110 0110 . . . first 8 bits in commodity code of 24 bits
    1111 1111 . . . next 8 bits in the commodity code
    0000 0000 . . . last 8 bits in the commodity code
    0011 1011 . . . channel number (still picture number) having detailed information
    1100 1101 . . . channel number (still picture number) having detailed information
    . . .
    . . .
    0000 0000 0000 0000 0001 . . . User Data End Code Therefore, the stream analyzing means 200 receiving the stream in the format mentioned above can identify that the present stream is the additional information '0000 0100' and this additional information relates to the commodity code '0100 0110 1111 1111 0000 0000', and then the MPEG2-Video still picture decoder 400 decodes the MPEG2-Video stream on the basis of the information of the following channel number or still picture number, whereby an image signal, that is, the detailed information, is obtained. This image signal is stored in the frame memory 104. When the recording request signal 12 from the user is input, the switch 106 is turned on, and the image signal, that is, the detailed information, is recorded in the recording HDD 108. On the other hand, the MPEG2-Video decoder 201 converts a moving picture of the channel of the input MPEG2-Video stream 20, which channel includes the additional information, into a video signal 14 by conventional decoding operation, and outputs the video signal 14 toward the signal synthesizing means 105. The signal synthesizing means 105 synthesizes the video signal 14 and the image signal stored in the frame memory 104, and outputs a monitor signal 17. As a method for synthesizing these signals, screen splitting into two pictures or overlapping is employed as in the aforementioned embodiments.

When the reproduction request signal 13 from the user is input, the switch 107 is turned on, and the image signal recorded in the HDD 108 is transmitted to the frame memory 104, wherein the image signal is converted to data for one picture. This data is input to the signal synthesizing means 105 and synthesized with the video signal 14 that is currently being received. Finally, the synthesized signal is output as a monitor signal 17.

As described above, according to the fourth embodiment of the present invention, a channel number or a still picture number having detailed information is written, as additional information, in the user data region of the MPEG2-Video stream 20 within the MPEG2standard. The MPEG2-Video stream 20 is decoded by the MPEG2-Video still picture decoder 400 on the basis of the additional information to produce an image signal and, on the other hand, the MPEG2-Video stream is decoded by the MPEG2-Video decoder 201 to produce a video signal 14. The image signal and the video signal 14 so produced are synthesized by the signal synthesizing means 105. Therefore, the additional information data is managed collectively.

Although the additional information is written in the MPEG2-Video layer in this fourth embodiment, it may be written in a region in MPEG2-System that is independently defined. This process will be described in more detail using FIG. 8.

Figure 8:
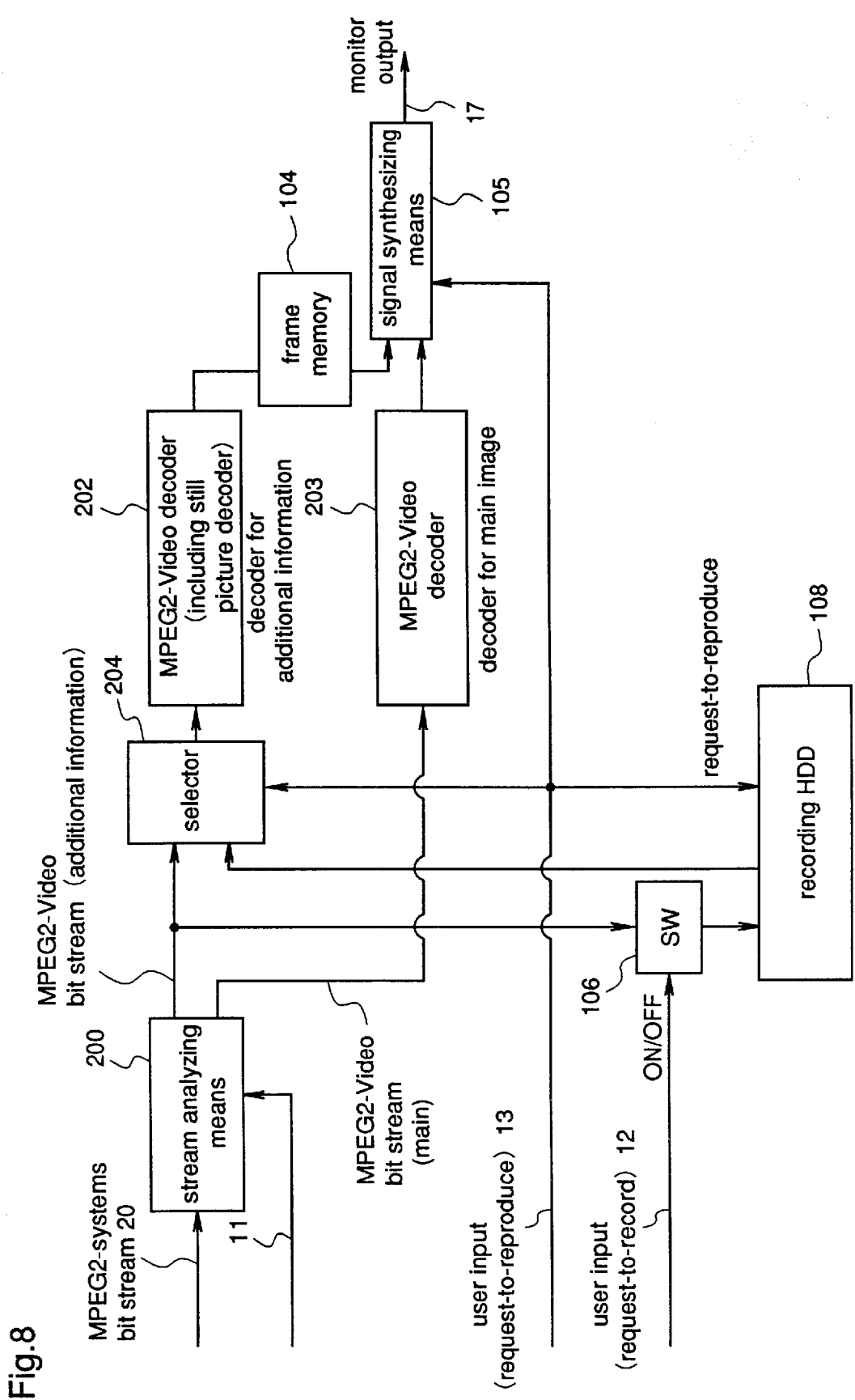
FIG. 8 is a block diagram illustrating a television receiver according to a modification of the fourth embodiment, wherein MPEG2-System Standard is employed.

In FIG. 8, a stream analyzing means 200 receives an MPEG2-System bit stream 20 (system stream) wherein video data and audio data coexist, and supplies the video stream that is currently being watched and listened by the user toward a main decoder 203. Further, when additional video data is appended to the MPEG2-System bit stream, this data is supplied to an additional information decoder 202.

The respective decoders 201 and 202 decode the input streams and convert the streams into video signals. Which stream is the additional information of the video stream currently being watched and listened by the user is defined independently by a user-defined region according to a syntax specified in MPEG2-System.

The additional information is not necessarily a still picture. Especially in digital transmission, a moving picture can be easily transmitted.

When the recording request signal 12 from the user is input, the stream (additional information) is recorded in the recording HDD 108. In this case, since recording of the additional information as it is compressed is possible, the capacity of the recording medium is used effectively.

When the reproduction request signal 13 from the user is input, only the additional information stream read from the HDD 108 is supplied to the additional information decoder 202 by the selector 204, and the additional information is decoded by the decoder 202. The decoded additional information is synthesized with the result of decoding of the main image, i.e., an output from the main image decoder 203, by the signal synthesizing means 105, and the synthesized signal is output as a monitor output signal 17. When the signal 17 is displayed on the monitor screen, screen splitting into two pictures (right and left) or picture-in-picture, wherein both the pictures are moving pictures, is employed.

MPEG2-System and MPEG2-Video employed in the aforementioned embodiments are provided in International Standard.

Although in the aforementioned embodiments stored data is displayed on a CRT (Cathode Ray Tube), the data may be output to a printer.

Further, when a television receiver according to any of the aforementioned embodiments is constructed as an interactive communication system, it can be applied to home shopping. A conventional interactive communication system is disclosed in, for example, Japanese Published Patent Application No. Hei. 7-123375.

Furthermore, although only the additional information is recorded in the recording HDD 108 in the aforementioned embodiments, the video signal may be recorded with the additional information. In this case, since the timing of superposing the additional information is delayed from the video signal, in order to record the video signal on the basis of the additional information, it is necessary to provide an image memory having a capacity for storing a video signal of about 15 seconds.

Furthermore, in the second to fourth embodiments of the invention, the content of the additional information, or the channel number or still picture number of the additional information is recorded. However, detailed information may be obtained by selecting an icon that is displayed on the screen. This process will be described in more detail hereinafter.

The position of an object having detailed information, such as a commodity, on the screen is defined relating to the detailed information at transmission. On the receiver's side, an icon is displayed in the position on the screen where the comodity having the detailed information is shown according to the instruction of the user, and the detailed information corresponding to the position of the icon, selected by the user is obtained by decoding another channel or still picture, and the detailed information so obtained is displayed on the screen and recorded as desired.

Also in this case, the additional information can be written in a user data region in the MPEG standard that is defined independently. For example, when an identifier of the additional information is '0000 0100' and a commodity code is '0110 0110 1111 1111 0000 0000', the additional information is defined as follows.

0000 0000 0000 0000 0000 1011 0010 . . . User Data Start Code (0xB2)

0000 0100 . . . identifier of the additional information 0000 0000 . . . upper 8 bits in 16 bits representing X-coordinate 1000 0000 . . . lower 8 bits in 16 bits representing X-coordinate 0000 0001 . . . upper 8 bit in 16 bits representing Y-coordinate 0000 0000 . . . lower 8 bits in 16 bits representing Y-coordinate 0110 0110 . . . first 8 bits in the commodity code of 24 bits 1111 1111 . . . next 8 bits in the commodity code 0000 0000 . . . last 8 bits In the commodity code 0011 1011 . . . channel number (or still picture number) having the detailed information 1100 1101 . . . channel number (or still picture number) having the detailed information

. . .

. . .

0000 0000 0000 0000 0001 . . . User Data End Code

The decoder in the receiver displays the icon in the position on the screen, for example, (128,256), on the basis of the additional information, in response to the user request. When the user selects the icon by remote control or the like, the channel or still picture having the detailed information is decoded, and the detailed information of a commodity that is displayed in the coordinate position is displayed on the screen. Furthermore, the detailed information can be recorded or printed as desired.

Also in this fourth embodiment, a user-defined region of MPEG2-System may be used for description of the additional information with the same effects as mentioned above.

What is claimed is:

1. A television receiver receiving a digitally coded compressed television signal, comprising:

digital television signal analysis means for analyzing the digitally coded compressed television signal, separating and extracting additional information from the digitally coded compressed television signal, and outputting the additional information as an additional information code;

additional information recording means for recording the additional information code;

additional information writing switch means for passing an additional information code corresponding to a previously input key word and blocking the additional information code that is output from the digital television signal analyzing means toward the additional information recording means, in response to a control signal;

conversion means for converting the additional information code output from the digital television signal analyzing means or the additional information code reproduced from the additional information recording means into a character or an image;

digital television signal decoding means for decoding the digitally coded compressed television signal and output a video signal; and signal synthesizing means for synthesizing the video signal output from the decoding means and the additional information that has been converted into a character or an image by the conversion means, and outputting the synthesized signal as a monitor output signal.

2. A television receiver as defined in claim 1 wherein the control signal controls the additional information writing switch means so that it passes the additional information code only when additional information designated by the user is detected.

3. An additional information transmitting method for transmitting a digitally coded television signal in which a program or commercial segment plus additional information relating to the segment are multiplexed, wherein the additional information to be transmitted is written in a user data region which is specified by the MPEG 2 standard of ISO/IFC 13818-2 (1996): Information Technology-Generic Coding of moving pictures and associated audio-Part 2: Video of the digitally coded television signal when the additional information is transmitted, wherein transmitted as the additional information are a code showing an object that provides information, and one of a character information code and an image information code which shows information of the object.

4. An additional information transmitting and receiving method for transmitting and receiving a digitally coded television signal in which a programor commercial segment plus additional information relating to the segment are multiplexed;

wherein the additional information to be transmitted is written in a user data region which is specified by the MPEG 2 standard of ISO/IFC 13818-2 (1996): Information Technology-Generic Coding of moving pictures and associated audio-Part 2: Video of the digitally coded television signal when the additional information is transmitted; and on the receiver's side, the digitally coded television signal including the additional information is decoded to separate the additional information from an ordinary video signal, and the additional information and the video signal are reproduced, wherein transmitted as the additional information are a code showing an object that provides information, and one of a character information code and an image information code, which shows information of the object; and on the receiver's side, the digitally coded television signal including the additional information is decoded to extract, as the additional information, the code showing an object that provides information and the character information code or the image information code, and to extract an ordinary video signal, and the additional information and the video signal are produced.

* * * * *